Oct. 31, 1939.   N. V. SMITH ET AL   2,178,004
GREASE GUN
Filed April 23, 1938   3 Sheets-Sheet 3
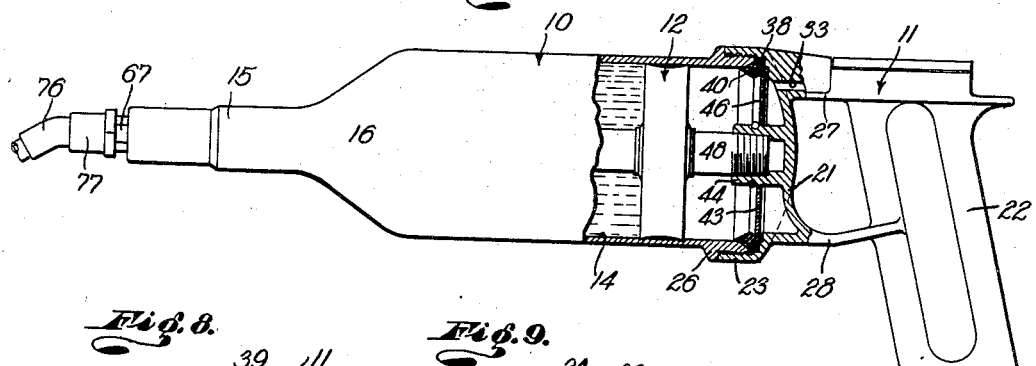
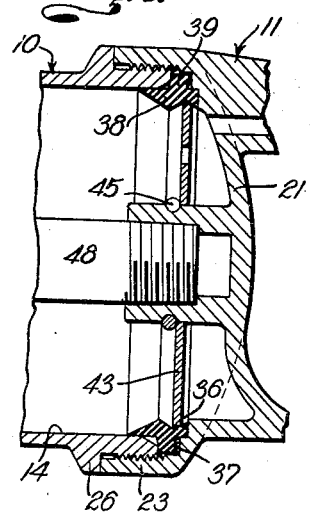
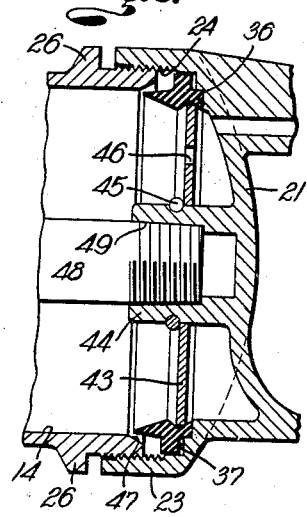
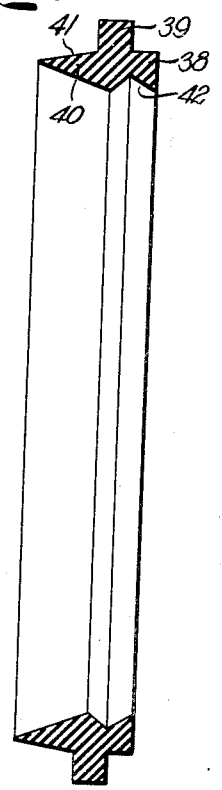
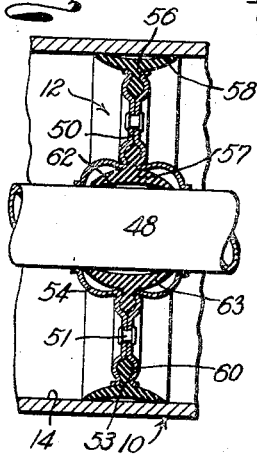
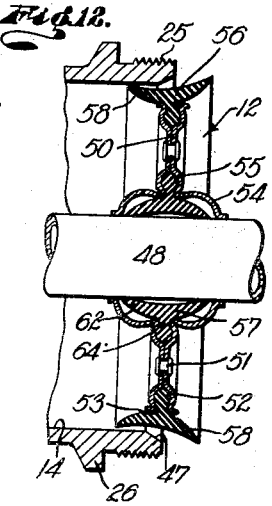
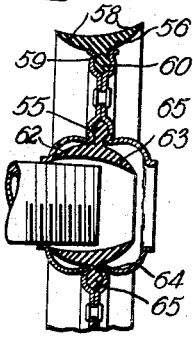
Inventors
NEIL V. SMITH
and CARL W. STOLL
By
Their Attorney Patented Oct. 31, 1939

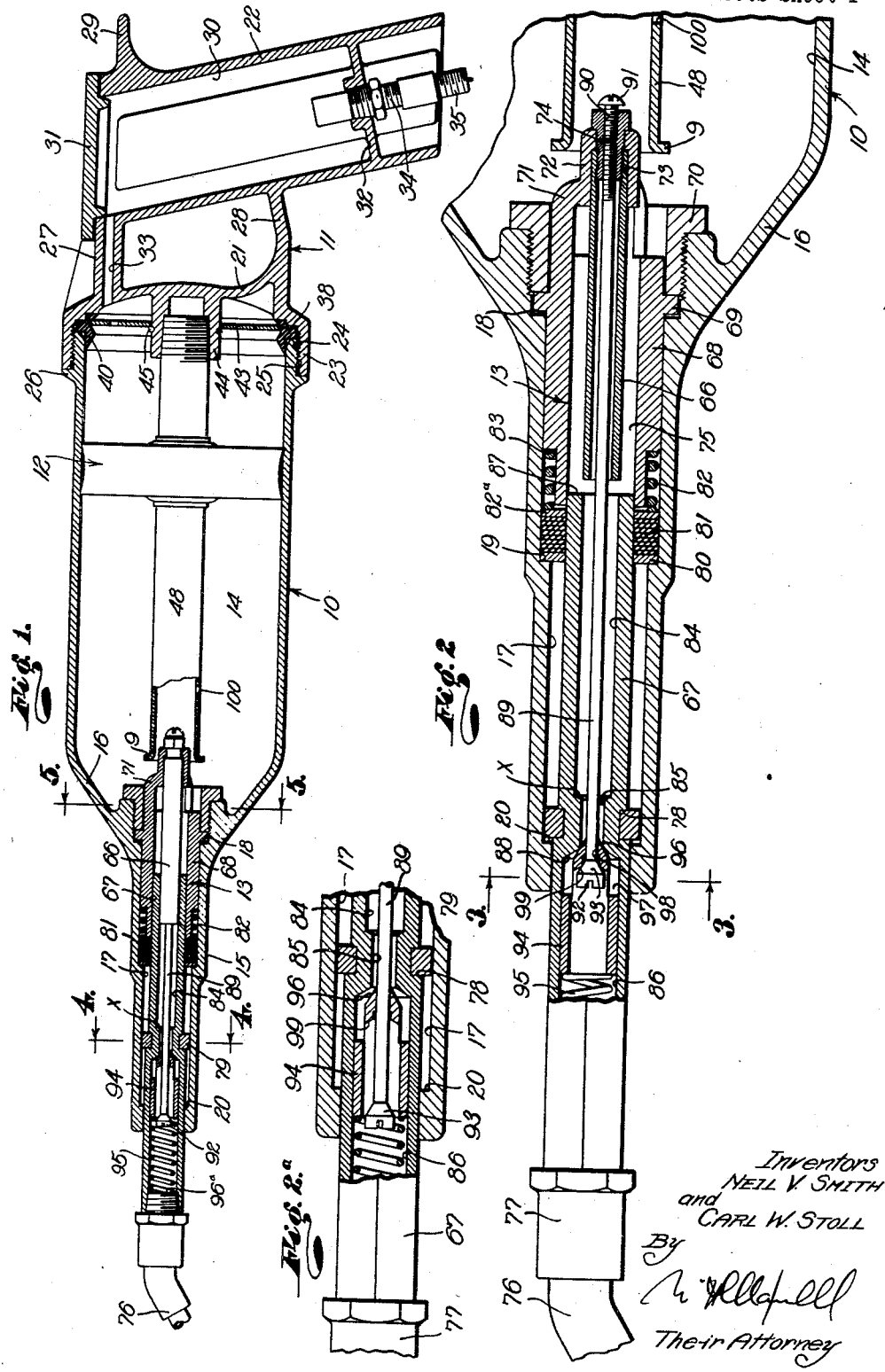

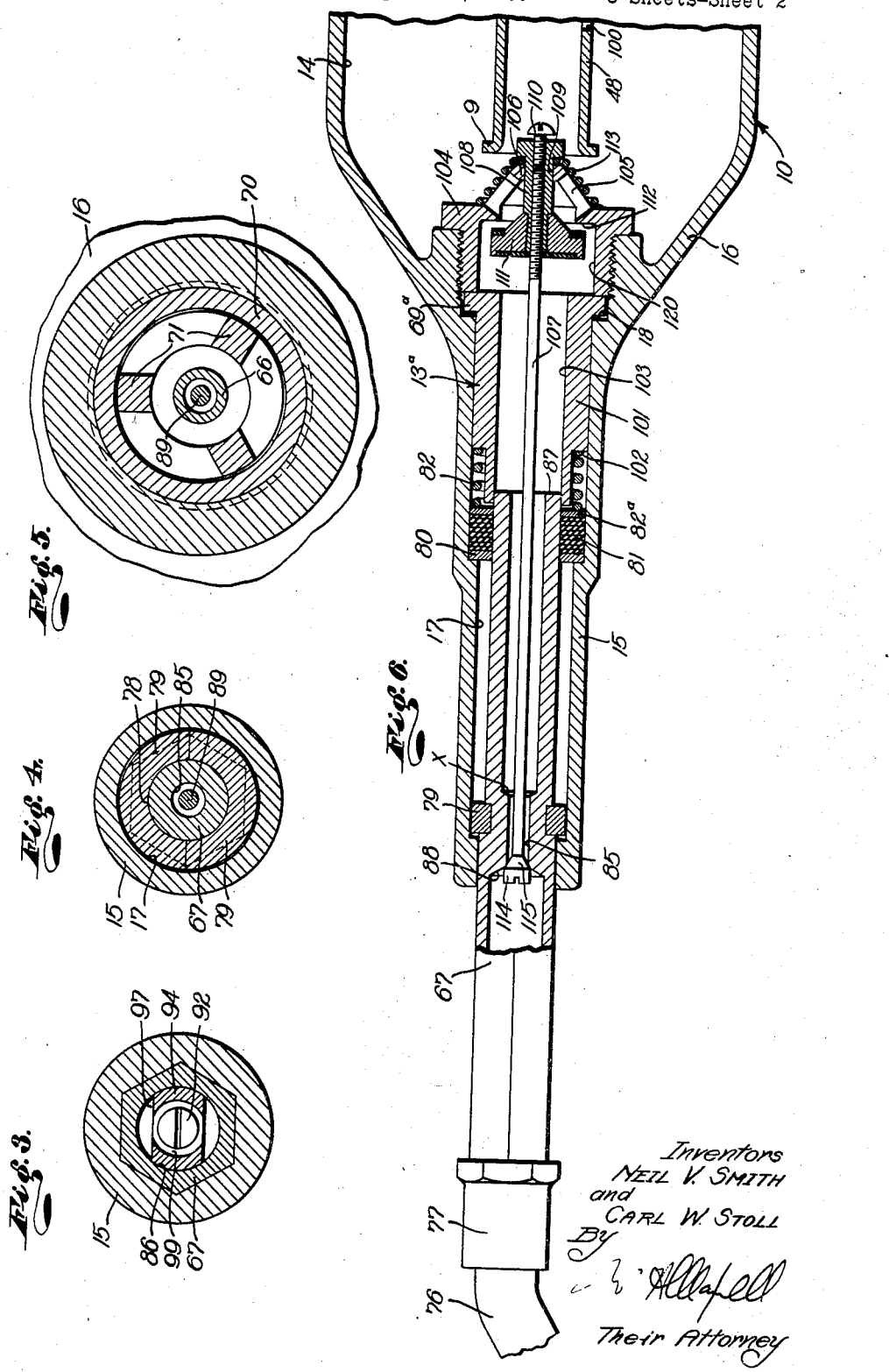

2,178,004

UNITED STATES PATENT OFFICE 2,178,004

GREASE GUN

Neil V. Smith and Carl W. Stoll, Los Angeles, Calif., assignor to Smith-Johnson Corporation, Los Angeles, Calif., a corporation of California Application April 23, 1938, Serial No. 203,840

15 Claims. (Cl. 221—47.4)

This invention relates to a lubricator or grease gun and relates more particularly to a hand grease gun, that is, a grease gun that is manually operated. A general object of this invention is to provide a lubricator or grease gun of the character referred to that is convenient to handle and operate, that contains a large supply of lubricant, and that is particularly rapid and effective in the delivery of charges of lubricant under pressure to bearings and other machine parts.

Another object of this invention is to provide a grease gun of the character mentioned embodying a novel and highly effective discharge or ejecting means in which the pressure on the lubricant stored in the gun holds the discharge valve closed thus avoiding the use of a valve holding spring as now employed in most devices of this class, and thereby eliminating the high parasitic friction loss present where such spring-held valves are employed.

Another object of this invention is to provide a grease gun of the character referred to that discharges a substantial and uniform quantity of lubricant at each operation or discharge stroke.

Another object of this invention is to provide a manually operated grease gun in which the lubricant in the supply chamber is maintained under air pressure and this pressure is utilized to effect the charging movement of a ram during the charging stroke, thus assuring the delivery of a full measure of lubricant at each discharge stroke regardless of the speed at which the gun is operated.

Another object of the invention is to provide a novel and sturdy ejecting mechanism for a grease gun, said mechanism having its parts constructed and related so that the piston element is effectively protected against bending and distorting stresses.

Another object of this invention is to provide a grease gun of the character mentioned in which the air pressure may be maintained on the supply of lubricant indefinitely, there being little or no loss of pressure at the joints or connections between the gun parts.

Another object of this invention is to provide a grease gun in which the leakage from the discharge nozzle is eliminated or reduced to a minimum.

Another object of this invention is to provide a manually operated grease gun that is rugged and not easily damaged.

Another object of this invention is to provide a grease gun of the character mentioned that may be easily and quickly changed or modified to handle lubricants of different types and consistencies and to develop relatively high pressures or relatively low pressures, as desired.

Another object of this invention is to provide a grease gun of the class mentioned in which a portion of the lubricant remaining in the outer part of the discharge coupling or connector tube is retracted or drawn in when the ram returns to its initial position so that lubricant does not drip or leak from the gun following its use.

Another object of this invention is to provide a novel and particularly effective sealing means or packing means for sealing between the separable parts of a lubricant gun which maintains the charging or priming pressure in the gun indefinitely, yet allows said parts to be easily disconnected for the purpose of recharging the gun with lubricant and permits the said parts to be quickly reconnected in the proper relation.

Another object of this invention is to provide a grease gun embodying packing means of the character just mentioned in which the packing means, occurring at the connection between the gun body and the handle section, assures the correct alignment of the said handle section with the discharge nozzle of the gun after extended use of the gun, yet positively prevents leakage or the loss of pressure from between the body and the handle section when the same are connected with the handle and the nozzle in proper alignment.

Another object of this invention is to provide a grease gun of the character mentioned embodying a dependable packing means or seal between the body and the handle section that does not depend for its tightness upon the extent or amount of the threading together of the parts whereby a positive stop means may be employed to assure the correct alignment of the nozzle and handle with the assurance that the packing means will always remain effective.

Another object of this invention is to provide a grease gun embodying a novel and particularly effective piston or follower having sealing lips distorted or bent to remain in sealing cooperation with the wall of the lubricant reservoir and with the central guide member.

A further object of this invention is to provide a grease gun embodying a piston or follower of the character just referred to that may be easily and quickly arranged in the operative position thereby facilitating the recharging of the gun with lubricant.

The various objects and features of our invention will be fully understood from the following detailed description of typical preferred forms and applications of the invention, throughout which description reference is made to the accompanying drawings, in which:

Fig. 1 is a longitudinal detailed sectional view of one form of the improved grease gun provided by this invention. Fig. 2 is an enlarged fragmentary longitudinal detailed sectional view of the forward portion of the gun showing the parts in their normal extended positions. Fig. 2ª is a fragmentary longitudinal detailed sectional view illustrating the positions of the valve elements during a discharge stroke. Fig. 3 is an enlarged transverse detailed sectional view taken as indicated by line 3—3 on Fig. 2. Figs. 4 and 5 are enlarged transverse detailed sectional views taken as indicated by lines 4—4 and 5—5, respectively, on Fig. 1. Fig. 6 is a view similar to Fig. 2 illustrating another form of ejecting means. Fig. 7 is a reduced side elevation of the grease gun of the invention with the rear portion of the body broken away to appear in vertical cross section showing the follower and the means for sealing between the body and the handle section. Fig. 8 is an enlarged fragmentary vertical detailed sectional view of the rear portion of the gun illustrating the packing means with the handle fully connected to the body. Fig. 9 is a view similar to Fig. 8 showing the handle section being threaded onto the body. Fig. 10 is an enlarged transverse detailed sectional view of the gasket or packing ring. Fig. 11 is a fragmentary vertical detailed sectional view of a portion of the gun showing the follower in cross section and in the operative position. Fig. 12 is a view similar to Fig. 11 showing the follower in position on the central guide member and about to enter the gun body and Fig. 13 is a fragmentary transverse detailed sectional view of the follower removed from the gun.

The form or embodiment of the grease gun provided by this invention illustrated in Figs. 1 to 5 inclusive, and 7 to 13 inclusive, may be said to comprise, generally, a container or body 10 for holding a supply of lubricant, a cap and handle section 11 on the rear end of the body 10, a follower 12 operable in the body 10, ejecting means 13 in the forward portion of the body 10 and other elements, the functions and details of which will be hereinafter described.

The container or body 10 is an elongate hollow structure for containing a supply of grease or other lubricant. In the preferred construction the body 10 is an integral member or casting. The major portion or rear portion of the body 10 is cylindrical and provides or defines a lubricant supply chamber 14. The forward end portion 15 of the body 10 is reduced in diameter and is joined with the major rear portion of the body by a tapered part 16. The reduced forward portion 15 carries or contains the ejecting means 13. A central longitudinal opening 17 extends through the forward body portion 15 from the supply chamber 14 to the forward end of the body. The forward body portion 15 and its opening 17 are co-axial with the rear portion of the body 10 and the supply chamber 14. The opening 17 is graduated in diameter to present axially spaced shoulders 18, 19 and 20. The shoulders 18, 19 and 20 are annular or continuous and face inwardly or toward the supply chamber 14. The shoulder 18 occurs adjacent the rear end of the opening 17, the shoulder 19 is substantially midway between the opposite ends of the opening 17 and the shoulder 20 is adjacent the forward end of the opening 17.

The section 11 serves as a removable closure or cap for the rear end of the gun body 10 and has a grip or handle to facilitate the operation and handling of the gun. The cap and handle section 11 is preferably an integral part or casting with the exception of two small elements to be subsequently described. The cap and handle section 11 includes what I will term a cap 21 and a handle 22. The cap 21 may be a simple closure element for the rear end of the lubricant chamber 14. The cap 21 is provided with a forwardly projecting tubular flange 23 having an internal thread 24 for mating with a thread 25 on the rear portion of the body 10. A bead or ridge 26 on the body 10 is engageable by the forward end of the flange 23 to form a positive stop and to limit the threading of the section 11 on the body 10.

The handle 22 is joined to the cap 21 by two vertically spaced webs 27 and 28. The handle 22 extends downwardly and rearwardly from the upper web 27 to a plane below the lower web 28. The handle 22 is shaped to be conveniently grasped and held by the operator. In practice the handle 22 may have substantially flat parallel sides and round or convex forward and rearward edges. The connecting web 28 is spaced some distance below the upper web 27 and lies in a plane adjacent the plane occupied by the lowermost part of the body 10. The lower web 28 is generally flat, presenting rather broad upper and lower surfaces. The spacing of the webs 27 and 28 is such that one or more fingers on the operator's hand grasping the handle 22 may grasp or engage that portion of the handle 11 between the webs and the remaining fingers of the hand may engage the portion of the handle below the web 28. The upper web 27 forms a guard for the operator's fingers and the lower web 28 being engaged between two of the operator's fingers facilitates the handling of the gun. A rearwardly projecting ear 29 is provided on the handle 22 adjacent its upper end and is adapted to be engaged by the operator's hand for the purpose of stabilizing and balancing the gun.

In accordance with the invention the handle 22 constitutes a reservoir for containing air under pressure which is employed to prime the gun. The handle 22 is hollow or provided with a chamber 30 for containing the air under pressure. The chamber 30 is preferably of substantial capacity and may extend from the upper end of the handle 22 to adjacent its lower end. The upper end of the chamber 30 is closed by a suitable cover 31 bolted or screwed to the upper end of the handle 22. A web or partition 32 extends transversely across the interior of the handle 22 above its lower end to close the lower end of the chamber 30. A port 33 communicates with the upper portion of the chamber 30 and extends forwardly through the web 27 and the cap 21 to communicate with the rear end of the lubricant supply chamber 14. Means is provided to supply or admit air under pressure to the chamber 30. A fitting 34 is threaded in an opening in the partition 32 and is provided with a tire valve 35. The valve 35 is adapted to receive air under pressure from an air hose, or the like, and the fitting 34 discharges the air under pressure into the chamber 30. The fitting 34 is entirely received in or recessed in the handle 22 and the valve 35 may project a slight distance beyond the lower end of the handle. It is to be observed that the air chamber 30 and the communicating rear portion of the lubricant chamber 14 provide a substantial space for containing the air under pressure.

The invention provides a novel and particularly effective packing means or gasket means for sealing between the section 11 and the body 10. The cap 21 of the section 11 is provided with a forwardly facing socket 36 at the base of the thread 24. The socket 36 has a forwardly facing shoulder 37 that opposes the rear end of the body 10 when the section 11 is threaded to the body. An annular gasket 38 of synthetic rubber or similar flexible and resilient material is arranged in the socket 36. The gasket 38 may closely fit the inner or rear portion of the socket 36 and has a peripheral ridge or flange 39 disposed in front or forwardly of the shoulder 37. The flange 39 is proportioned and located to be received between the shoulder 37 and the rear end of the body 10. The forward part of the gasket 38 is in the nature of a sealing lip 40 for sealing or packing with the wall of the body chamber 14. The external or peripheral surface 41 of the lip 40 slopes or inclines forwardly and inwardly with respect to the longitudinal axis of the gasket 38 as the gasket is initially formed and prior to the attachment of the section 11 to the body 10. The inner surface of the lip 40 may slope forwardly and outwardly with respect to the longitudinal axis of the gasket 38 to be in converging relation to the surface 41.

The external diameter of the lip 40, or at least the forward part of the surface 41, preferably has a diameter slightly less than the diameter of the chamber 14 prior to the connection of the section 11 to the body 10. The gasket 38 is shaped and proportioned so that the engagement of its inner or rear part with the rear wall of the socket 36 holds the flange 39 in spaced relation to the shoulder 37. Means is provided to retain the gasket 38 on the cap 21 of the section 11. An annular groove 42 of V-shaped cross section is provided in the internal surface of the gasket 38 and a plate 43 has its peripheral portion in cooperation with the groove 42. The plate 43 is arranged on a boss 44 on the inner or forward side of the cap 21. A spring ring 45 is seated in a groove in the boss 44 to hold the plate 43 in place. The plate 43 has perforations 46 to put the port 33 in communication with the chamber 14. The plate 43 cooperates with the groove 42 to retain the gasket 38 in place in the cap 21 and to prevent buckling and undesirable distortion of the gasket.

When the cap and handle section 11 is being threaded on the body 10, the forward side of the flange 39 comes into contact with the rear end of the body 10 before the forward end of the flange 23 reaches the ridge 26. As the section 11 is threaded on the body 10 the cooperation of the flange 39 with the rear end of the body 10 results in bending or rearward distortion of the flange 39. This distortion of the gasket 38 pivots or moves the sealing lip 40 outwardly into sealing cooperation with the wall of the chamber 14. The periphery of the retaining plate 43 cooperating with the groove 42 serves as a fulcrum for the outward pivoting of the sealing lip 40. By the time the forward end of the flange 23 has reached the ridge 26 the gasket 38 has been distorted to a condition or shape such as shown in Fig. 8 of the drawings where the lip 40 is in tight sealing engagement with the wall of the chamber 14. The inherent resiliency of the gasket 38 urges the surface 41 of the lip 40 outwardly into tight sealing cooperation with the wall of the chamber 14 to provide a positive fluid-tight seal. The gasket 38 has its rear portion in tight sealing engagement with the wall of the socket 36, and the flange 39 is tightly held against the rear end of the body 10 so that the gasket 38 forms a dependable sealing element for preventing leakage from between the threaded together body 10 and cap and handle section 11.

It is to be particularly noted that the fluid-tight and pressure-tight seal provided by the gasket 38 does not depend upon the compression of the gasket between parts or surfaces of the body 10 and section 11. This is important as it allows the forward end of the flange 23 to be directly engaged against the metal ridge 26 to definitely limit the threading of the section 11 on the body 10. The forward end of the flange 23 and the rear side of the ridge 26 have direct metal to metal contact to positively limit the threading of the section 11 on the body 10. These parts may be related and machined to assure the proper positioning of the section 11 with respect to the body 10 when their surfaces are brought together as just described, and thereby effect proper alignment between the handle 22 and the discharge nozzle of the gun. The sealing lip 40 of the gasket 38, in addition to being held in tight sealing engagement with the wall of the chamber 14 by the resiliency of the distorted gasket, is urged outwardly by the air pressure in the rear portion of the chamber 14 and at all times provides a tight seal. The extreme rear end portion of the chamber 14 preferably has an outwardly flared or bevelled wall 47 to assist in guiding the lip 40 into the body when the section 11 is being threaded on the body. The gasket 38 is secured or held on the section 11 by the plate 43 and does not require manual manipulation when the section 11 is to be threaded on the body 10 and automatically assumes its proper place in the rear portion of the body 10 when the section is applied to the body. This automatic locating of the gasket 38 and the automatic distortion of the gasket 38 into sealing cooperation with the body 10 materially facilitate the quick coupling of the section 11 to the body.

The follower 12 is arranged in the lubricant supply chamber 14 and is operable under the influence of the air under pressure in the rear end portion of the chamber to urge the lubricant forwardly and feed it to the ejecting means 13. It is preferred to provide a central or axial guide 48 for the follower 12. In the typical case illustrated in the drawings the guide 48 is in the nature of a tube of suitable diameter centrally arranged in the chamber 14. The rear portion of the guide 48 is removably threaded in a socket 49 in the boss 44. The follower 12 is an annular structure or assembly and comprises two plates 50 of sheet metal or the like secured together in face to face relation by rivets 51. The outer parts or peripheral portions of the plates 50 are bowed or curved to define or leave an annular groove 52 that is partially circular in cross section. The peripheral edges of the plates 50 are spaced apart, leaving a mouth 53 for the groove 52. The peripheral edge portions of the plates 50 are curled or rolled back at the mouth 53 as best illustrated in Figs. 11, 12 and 13. The inner portions 54 of the plates 50 are bent or shaped to extend axially of the guide 48 and to operate along the guide. Adjacent the lines of joinder of the portions 54 with the bodies of the plates 50 the plates are shaped to define an annular groove 55. The groove 55 is similar in shape to the groove 52 and the plates 50 are formed so that the groove 55 has an inwardly facing entrance or mouth.

The follower 12 further includes an outer or peripheral sealing element 56 for slidably sealing with the wall of the chamber 14 and an inner sealing element 57 for slidably sealing with the guide 48. The sealing elements 56 and 57 may be formed of synthetic rubber, a rubber composition, or other material that has the desired resiliency and flexibility and that is resistant to the action of the material handled by the gun. The shape, arrangement and operation of the sealing elements 56 and 57 are important features of the invention.

The peripheral sealing element 56 of the follower 12 is in the nature of a continuous ring or annular member. The element 56 is shaped to have axially projecting lips 58 for sealing with the wall of the chamber 14. The internal surface of the element 56 as presented by the lips 58 is convex while the external or peripheral surface of the element 56 is concave. These concave and convex surfaces join at relatively sharp edges at the extremities of the sealing lips 58. An annular inwardly projecting rib 59 is provided on the inner surface of the element 56 and has an enlargement 60 that is received in the groove 52. The rib 59 enters the entrance or mouth 53 of the groove 52 and the enlargement 60 occupies the groove. The enlargement 60 is round or partially round in cross section and accurately fits the groove 52. In practice the enlargement 60 is gripped in the groove 52 so that an effective seal is formed between the sealing element 56 and the assembled plates 50. The rib 59 projects from the groove 52 and spaces the lips 58 outwardly from the peripheries of the plates.

In accordance with the invention the sealing element 56 is initially constructed and is assembled on the plates 50 so that its sealing lip 58 that projects forwardly and that leads during the insertion of the follower 12 in the chamber 14 has a diameter considerably less than the diameter of the other lip or trailing lip 58. The external diameter of the said advancing lip 58 is less than the diameter of the chamber 14 while the external diameter of the said trailing lip 58 is considerably greater than the diameter of the chamber 14. This relationship between the diameters of the sealing lips 58 and the diameter of the chamber 14 is best illustrated in Fig. 12 of the drawings. When the follower 12 is introduced into the chamber 14 the forward lip or the advancing lip 58 freely enters the mouth of the chamber 14 and as the inward movement of the follower 12 is continued the peripheral surface of the trailing lip 58 is brought into cooperation with the wall of the chamber 14. As the trailing lip 58 is initially or normally of greater external diameter than the chamber 14 the engagement of the lip with the wall of the chamber results in distortion of the said trailing lip 58 and distortion of the sealing element 56 and what may be termed pivoting of the element at its rib 59. The distortion and pivoting of the element 56 resulting from the cooperation of the trailing lip 58 with the wall of the chamber 14 brings the periphery of the advancing lip 58 into effective sealing engagement with the wall of the chamber. Fig. 11 of the drawings illustrates the condition of the sealing element 56 when the follower is fully within the chamber 14. The inherent resiliency of the sealing element 56 maintains both of its sealing lips 58 in proper sealing cooperation with the wall of the chamber 14. It is important to note that the cooperation of the trailing lip 58 with the wall of the chamber 14 holds the sealing element 56 in a distorted state and retains the forward lip 58 in effective engagement with the wall of the chamber 14 so long as the follower 12 remains in the chamber 14.

The inner sealing element 57 of the follower 12 is an annular member and has two axial sealing lips 62 and 63 for slidably sealing with the guide 48. The sealing lips 62 and 63 are integrally joined and present a concave inner surface and a convex outer surface. These inner and outer surfaces join at rather sharp edges defining the outer ends of the lips 62 and 63. A central outwardly projecting annular rib 64 is provided on the periphery or outer surface of the sealing element 57 and enters the mouth of the groove 55. An annular enlargement 65 is provided on the rib 64 and is shaped to fit the groove 55. In assembling the follower 12 the sealing elements 56 and 57 may be arranged in position on one plate 50 and the other plate 50 may then be brought into position whereupon the two plates are riveted together so that the enlargements 60 and 65 of the sealing elements are held or clamped in their respective grooves 52 and 55. This assures the proper gripping of the enlargements 60 and 65 between the plates 50, it being understood that the said enlargements are not grasped so tightly that the material of the sealing elements 56 and 57 is excessively distorted or forced outwardly. The inner sealing element 57 is shaped and is held by the assembly of the plates 50 so that its leading lip 62 has an inside diameter greater than the external diameter of the guide 48 and its trailing lip 63 has an inside diameter less than the external diameter of the guide 48. This relationship between the lips of the sealing element 57 and the guide 48 is best illustrated in Fig. 13 of the drawings.

When the follower 12 is to be assembled on the guide 48 the guide is first unthreaded from the socket 49 and the follower is slid or passed on the rear end of the guide. When the follower 12 is slipped on the guide 48 the leading lip 62 of the sealing element 57 freely receives and passes over the guide 48. The rear or trailing lip 63 contacts the periphery of the follower 48 and due to the relationship between the diameters of the lip 63 and the guide 48 this engagement results in distortion or outward flexing of the lip. The engagement of the trailing lip 63 with the guide 48 further results in a general distortion of the sealing element 57 and a pivoting or flexing of the element at its rib 64 to bring its leading lip 62 into effective sealing engagement with the guide 48. Figs. 11 and 12 of the drawings illustrate the manner in which both the lips 62 and 63 engage and seal with the guide 48. The resiliency of the distorted sealing element 57 maintains both of its sealing lips 62 and 63 in correct sealing engagement with the guide 48. The shape of the sealing lips 62 and 63 is such that they engage or bear on the guide 48 adjacent their extremities or outer edges as shown in Figs. 11 and 12 of the drawings.

The inner or axially projecting portions 54 of the plates 50 extend axially beyond the extremities of the sealing lips 62 and 63 and the lips have clearance with the portions 54. This relationship of parts assures the desired independent sealing action of the lips 62 and 63. The rear or trailing plate portion 54 is adapted to co-operate with the boss 44 to limit rearward movement of the follower 12, while the forward or advancing plate portion 54 is adapted to cooperate with an out-turned bead 9 on the forward end of the guide 48 to limit the forward travel of the follower. A port 100 is provided in the wall of the tubular guide 48 adjacent its forward end. When the follower 12 approaches the forward end of its stroke its sealing element 57 passes forward beyond the port 100. This allows the air pressure to by-pass around or past the follower 12 so that the pressures on the follower are equalized. The primary function of the port 100 is to allow free by-passing of the air around the follower 12 when the guide 48 and the follower 12 are withdrawn from the chamber 14.

It is to be observed that the follower 12 is removable from the gun body 10 with the section 11 when the section is disconnected from the body. In other words, when the section 11 is unthreaded from the body 10 it may be moved rearwardly from the body to withdraw the guide 48 and the follower 12 from the chamber 14. In re-applying the section 11 to the body 10 the guide 48 is introduced into the chamber 14 and the follower 12 is moved to the rear part of the guide and is then introduced into the rear end of the chamber 14. As described above, the leading lip 58 of the sealing element 57 is readily started or introduced into the rear end of the chamber 14 so that the follower is easily inserted in the chamber. The follower 12 may remain on the guide 48 when the section 11 is removed from the body 10 for the purpose of recharging the chamber 14 with lubricant and it is only necessary to remove the follower from the guide when it becomes necessary or desirable to replace the follower or some of its parts.

The ejecting means 13 is operable to eject charges of lubricant from the chamber 14 to the bearings on the machine parts being lubricated. The means 13 is in the nature of a ram cylinder mechanism and is operated by movement or manipulation of the gun body 10. In accordance with the invention the means 13 includes a ram element 66 arranged in the forward portion 15 of the body 10 to move therewith and a plunger and cylinder element 67 movable relative to the body 10 and cooperable with the ram element 66. The ram element 66 is carried by a tubular guide member 68 arranged in the opening 17. The rear end of the tubular member 68 is open to the lubricant supply chamber 14 and the member is positioned so that its forward end is spaced some distance rearwardly of the shoulder 19. An annular external flange 69 is provided on the member 68 and has its forward side in adjacent opposing relation to the shoulder 18. An annular retainer nut 70 is threaded in the rear part of the opening 17 and cooperates with the rear side of the flange 69 to hold the guide member 68 against rearward movement. The tubular member 68 has three spaced or diametrically opposite fingers 71 projecting rearwardly through the retainer nut 70 and carrying a cross head 72. A longitudinal opening 73 is provided in the cross head 72 and the rear portion of the ram element 66 is received in this opening 73. A securing member 74 is passed forwardly through the rear end of the opening 73 and has a head cooperating with the rear side of the cross head 72. The securing member 74 has threaded cooperation with the ram element 66 to connect or secure the ram element to the member 72. The ram element 66 is an elongate part arranged longitudinally and co-axially in the member 68. In the preferred construction the ram element 66 extends forwardly from the cross head 72 to a point or plane adjacent but rearward of the forward end of the member 68. The ram element 66 is received in the guide member 68 with substantial clearance, leaving a relatively large annular space or passage 75 for passing lubricant and for receiving the element 67 as will be subsequently described.

The element 67 may be considered as a combination plunger and cylinder element. The element 67 enters the forward end of the opening 17 and extends rearwardly through the opening 17 to cooperate with the ram element 66. The portion of the opening 17 extending forwardly from the shoulder 20 is polygonal in cross section and the part of the element 67 operating therein is correspondingly shaped. This relationship of parts prevents turning of the element 67 relative to the body. The forward projecting end part of the cylinder element 67 carries a suitable discharge element 76. A suitable coupling 77 connects the element 76 with the element 67. The element 76 preferably projects laterally as well as forwardly from the element 67 and lies in the same plane as the handle 22 of the section 11. The above-described connection between the body 10 and the section 11 embodying a metal to metal contact between the flange 23 on the section 11 and the ridge 26 assures the proper alignment of the handle 22 and the discharge element 76. An annular groove 78 is provided in the cylinder element 67 and a split stop ring 79 is arranged in the groove 78 to limit the travel of the cylinder element relative to the body 10.

The cylinder element 67 is adapted to reciprocate in the member 68, that is, it is movable in the space or passage 75. The cylinder element 67 preferably has accurate sliding cooperation with the outer wall of the passage 75 and is thereby guided by the long heavy guide member 68. Packing means is provided for sealing about the element 67 to prevent the leakage of lubricant from about the cylinder element. A ring 80 is engaged forwardly against the shoulder 19 and a laminated packing assembly 81 is arranged forwardly against the ring 80 to surround and seal with the element 67. A helical spring 82 is arranged under compression between a washer 82ª at the rear end of the packing assembly 81 and a shoulder 83 on the member 68. The spring 82 holds the packing assembly 81 under the desired compression and urges the member 68 rearwardly so that its flange 69 bears against the retainer nut 70. In this connection it is to be observed that the member 68 is spring-held, that is, it is maintained in position by the spring 82 and may move forwardly against the action of the spring until its flange 69 contacts the shoulder 18. The spring-held or spring-urged packing assembly 81 dependably seals about the element 67 to prevent the leakage of lubricant forwardly around the element.

The construction, relationship and action of the guide member 68, the plunger and cylinder element 67, and the ram element 66 are important features of the invention. The tubular guide member 68 is preferably accurately formed or machined. In practice the member 66 may be a die casting and, being a simple part, is readily formed or proportioned to have the correct relationship to the other parts. The member 68 is proportioned to fit the body opening 17 with a slight tolerance to give a limited lateral play or movement. Similarly, flange 69 of the element 68 has clearance with the shoulder 18 to allow a slight longitudinal movement of the member, and the spring 82 is yieldable to allow this longitudinal movement. From the above it will be seen that the tubular guide member 68 is free to shift or float at will within limits within the body opening 17. The rear end part of the ram element 66 is received in the opening 73 of the guide member 68, and is accurately proportioned to correctly fit the opening 73, with its rear end face bottoming in the opening 73. Thus the element 66 is maintained in accurate co-axial relation with the guide member 68 at all times.

The cylinder element 67 is proportioned to be guided in the forward part of the opening 17 for longitudinal movement and for limited lateral play or movement. The packing 81 is such that it supports or guides the element 67 for similar limited lateral play. Thus the cylinder element 67 may also float within limits within the body opening 17. It is to be noted that the floating cylinder element 67 is cooperable with and guided by the floating tubular member 68. Due to this mutual floating relationship, any forces tending to cause misalignment between the ram element 66 and the cylinder 84 of element 67 are resisted by the large external surface of the member 68 cooperating with the wall of the opening 17 and the large external surface of the element 67 cooperating with the internal wall of the member 68. The thick walled tubular member 68 thus forms a dependable and accurate guide for the heavy cylinder member 67 to maintain the cylinder 84 in accurate co-axial relation with the slender piston element 66 at all times. This handling of any misaligning forces relieves the small slender high pressure piston element 66 of all bending stresses. The advantages just mentioned are obtained by an assembly that is very sturdy and rugged while being particularly inexpensive and easy to assemble.

In accordance with the invention a reduced opening 85 extends forwardly in the element 67 from the cylinder 84 and merges with a larger opening 86 extending to the forward end of the element where it communicates with the discharge fitting 76. A rearwardly facing internal shoulder X occurs in the element 67 where the reduced opening 85 joins the cylinder 84. It is to be observed that the element 67 arranged as just described has its rear end 87 exposed to the action of the lubricant under pressure in the passage 75 and has its shoulder X exposed to this action when it is clear of the ram element 66. The fluid pressure or lubricant pressure acting on the shoulder X and the end 87 of the element 67 normally holds the element 67 in its forward or extended position and the pressure acting on the end 87 returns the element 67 from an in or contracted position to an out or extended position as will be more fully described.

Novel and particularly effective valve means is provided to control the discharge of lubricant from the plunger element 67 and the discharge element 76. The valve means is such that the pressure on the lubricant contained in the gun operates to hold it closed so that no springs are required for this purpose, and so that the greater the pressure on the lubricant in the gun the greater the pressure serving to hold the valve means closed. The elimination of the usual valve closing spring eliminates the parasitic power loss accompanying the use of such a spring.

The valve means includes an annular valve seat 88 on the interior of the plunger or cylinder element 67. The valve seat 88 faces outwardly or forwardly and occurs where the reduced opening 85 joins the forward opening 86 of the element 67. The valve means further includes a valve stem 89 carried by or connected with the member 68. In the particular form of the invention illustrated in the drawings the ram element 66 is tubular and the valve stem 89 extends longitudinally through the ram element and has its rear portion threaded in a longitudinal opening 90 in the securing member 74. A screw 91 is threaded in the rear end of the opening 90 to cooperate with the rear end of the valve stem 89 to secure or lock the valve stem in the set or adjusted position. The valve stem 89 extends forwardly through the cylinder 84 and the opening 85 and extends into the opening 86. The stem 89 has substantial clearance in the cylinder 84, the opening 85 and the opening 86. A head 92 is provided on the forward end of the stem 89 and is slotted to facilitate the threading of the stem in the opening 90. The rear side of the head 92 is bevelled or tapered to constitute a valve face 93. With the parts in the normal positions the head 92 is spaced forwardly from the valve seat 88 so that the surface 93 is some distance forwardly of the seat.

The valve means further includes a tubular valve 94 in the opening 86 associated with the valve stem 89 and cooperable with the seat 88. The valve 94 is slidable or movable in the opening 86 and is urged rearwardly by a helical spring 95 housed in the opening 86. The spring 95 is under compression between the forward end of the valve 94 and a part or a shoulder 96ᵃ on the coupling 77. The spring 95 may be a relatively light spring. The rear end portion of the valve 94 is reduced in diameter and has a tapered valve face 96 cooperable with the seat 88 to close the opening 85. The valve face 96 has a steeper pitch than the valve seat 88 to have line contact with the seat. The valve 94 has lateral ports 97 immediately forward of its face 96 so that lubricant passing between the seat 88 and the face 96 when the valve 94 is opened is allowed to enter the valve 94 and pass forwardly out of the gun. A central longitudinal opening 98 is provided in the rear reduced portion of the valve 94 to slidably pass or receive the stem 89. A forwardly facing tapered face or seat 99 is provided on the interior of the valve 94 at the forward end of the opening 98 and is engageable by the face 93 of the head 92. The valve 94 is in the nature of a check valve and serves to close the forward end of the cylinder 84 during the charging stroke to prevent the return or rear flow of the lubricant as the ram element 66 moves rearwardly in the cylinder.

With the valve parts in the normal or extended positions as shown in Fig. 2, the valve face 96 cooperates with the seat 88 and the face 93 cooperates with the seat 99 so that the opening 85 in the cylinder element 67 is fully closed off against the forward discharge of lubricant. The parts are related so that the stop ring 79 is spaced rearward of the shoulder 20 when the valve means is closed as just described. Fluid pressure or lubricant pressure acting on the rear end 87 of the element 67 and acting on the internal shoulder X of the element 67 urges the element forwardly so that its valve seat 88 is urged forwardly against the valve face 96 and this cooperation in turn forces the valve 94 forwardly so that its seat 99 is urged against the valve 93. The valve stem 89 is carried by the body 10 through the medium of the connecting member 74 and the member 68 and therefore may be considered as remaining stationary relative to the body.

Fig. 2a of the drawings illustrates the positions of the various elements of the ejecting means 13 during the discharge stroke. It may be assumed that the ram element 66 moves forwardly into the cylinder 84 at the start of the discharge stroke and continues its forward movement during the remainder of this stroke. The entrance of the ram element 66 into the cylinder 84 traps a charge of lubricant in the cylinder. The valve stem 89 moves forwardly with the ram element 66 and its head 92 moves forwardly away from the seat 99. The ram element 66 moving forwardly into the cylinder 84 puts the lubricant therein under pressure and when this pressure reaches a certain value it overcomes the spring 95 and forces the valve 94 forwardly off its seat 88. The lubricant under pressure from the cylinder 84 then passes forwardly through the seat 88, through the ports 97 and the tubular valve 94 and then through the opening 85 and the discharge element 76 to the lubricant receiving fitting on the machine part or bearing.

During the charging stroke it may be assumed that the ram element 66 moves rearwardly in the cylinder 84. Immediately following the discharge stroke or at the initiation of the charging stroke the spring 95 closes the valve 94, bringing the face 96 into cooperation with the seat 88. As the ram element 66 moves rearwardly in the cylinder 84 a reduced pressure or vacuum is created in the cylinder and the external pressure or atmospheric pressure acting on the valve 94 urges its face 96 into tight cooperation with the seat 88. The valve stem 89 moves rearwardly with the ram element 66 and slides through the opening 98 in the valve 94. Fig. 1 of the drawings illustrates the positions of the various parts of the ejecting means 13 during the charging stroke. When the ram element 66 leaves the rear end of the cylinder 84 a charge of lubricant under pressure is forced into the cylinder. The face 93 of the head 92 cooperates with the valve seat 98 immediately following or substantially simultaneously with the passage of the forward end of the ram element 66 from the rear end of the cylinder 84. The parts are then in the positions illustrated in Fig. 2.

It is believed that the operation of the grease gun just described will be readily understood. In operation it may be assumed that a supply of lubricant has been provided in the chamber 14 and that air under pressure has been supplied to the air chamber 30 and the rear portion of the chamber 14. It may also be assumed that the cylinder 84, the passage 75, the opening 85 and the interior of the tubular ram element 66 are occupied by the lubricant under pressure. The discharge element 76 is equipped with an appropriate coupler (not shown) adapted to be arranged against or connected with a lubricant receiving fitting on a bearing or the like whereby the operator grasping the handle 22 may apply a forward thrust on the handle to move the body 10 forwardly. The discharge element 67 connected or associated with the lubricant receiving fitting on the bearing remains stationary so that the body 10 moves forwardly relative to the fitting 76 and the element 67. The ram element 66 moves forwardly with the body 10 and passes into the cylinder 84.

When the ram element 66 enters the cylinder 84 lubricant in the cylinder is cut off from the main body of lubricant in the body 10 and is trapped between the forward end of the ram element 66 and the valve face 96. The stem 89 is connected with the ram element 66 and moves forwardly with the ram element so that its head 92 moves forwardly away from the valve seat 99 and the seat 88. The ram element 66 moving forwardly in the cylinder 84 puts the lubricant therein under increased pressure and this lubricant under pressure acting on the valve face 96 moves the valve 94 forwardly against the action of the spring 95. In this connection it is to be observed that the spring 95 may be a relatively light spring to offer a minimum of resistance to the discharge of lubricant under pressure from the cylinder 84. The ram element 66 displacing the lubricant from the cylinder 84 in effect ejects a charge of lubricant under pressure through the opening 86 and the fitting 76 to the lubricant receiving fitting on the machine bearing.

When the body 10 has reached the end of its forward stroke the operator may either disconnect the fitting 76 from the lubricant receiving fitting, or he may hold the gun in such a manner that the fitting 76 remains connected with or associated with the lubricant receiving fitting as he moves the body 10 rearwardly preparatory to another ejection stroke. It is an important feature of the invention that the pressure on the lubricant in the body 10 operates to automatically return the cylinder element 67 and the body 10 to their original relative positions and thus automatically charge the cylinder 84 with lubricant for a succeeding ejection stroke. In the event that the discharge element 76 is disassociated from the lubricant receiving fitting on the machine part, the lubricant pressure acting on the rear end 87 of the element 67 moves or forces the element 67 forwardly with respect to the body 10. On the other hand, if the fitting 76 is retained in connection with the lubricant receiving fitting on the machine part, the fluid under pressure in the body 10 reacts between the said end 87 and the forwardly facing surfaces within the body 10 and tends to move the body 10 rearwardly relative to the element 67.

The automatic forward movement of the element 67 with respect to the body 10, or the automatic rearward movement of the body 10 with respect to the element 67, is accompanied by what may be considered rearward movement of the ram element 66 in the cylinder 84 and rearward movement of the stem 89 with respect to the cylinder element 67. It will be seen that the relative movement between the ram element 66 and the element 67 creates a reduced pressure in the forward portion of the cylinder 84. This reduced pressure tends to hold the valve face 96 in tighter engagement with the seat 88. The spring 95 assures the closing of the valve 94 at the start of the charging stroke and the valve 94 cooperating with the seat 88 prevents the lubricant in the opening 86 from being drawn back into the cylinder 84. The stem 89 moving rearwardly through the opening 98 in the valve 94 during the rearward movement of the ram 66 causes lubricant in the outer portion of the discharge element 76 to be drawn rearwardly in the fitting. This prevents the loss or discharge of lubricant from the element 76 following the disconnection of the gun from the lubricant receiving fitting.

When the forward end of the ram element 66 passes rearwardly out of the cylinder 84 the lubricant under pressure in the passage 75 passes into the cylinder 84. Immediately following the passage of the ram element 66 out of the cylinder 84 the valve face 93 on the head 92 moves into engagement with the seat 89 on the valve 94. This closes the opening 98 against forward leakage or passage of lubricant under pressure, while the face 96 cooperating with the seat 88 prevents the forward discharge of lubricant under pressure through the opening 85.

It is to be observed that when the ram 66 leaves the rear end of the cylinder 84 that lubricant under pressure acts forwardly on the shoulder X as well as the end 87 of the element 67 to urge the cylinder element forwardly. This tendency on the part of the lubricant pressure acting on the cylinder element 67 forces the seat 88 tightly against the valve face 96 to assure a tight seal at this point and forces the valve 94 forwardly so that its seat 99 is tightly held against the valve face 93 to assure a tight seal at this point. Thus it will be seen that the pressure within the gun serves to automatically hold the valve means closed to positively prevent the leakage of lubricant from the cylinder 84 and therefore from the fitting 79 of the gun. The valve means at the forward end of the cylinder 84 is quickly and tightly closed substantially simultaneously with the movement of the ram element 66 out of the rear end of the cylinder 84.

The threaded valve stem 89 may be adjusted to assure the full tight closing of the valve means and may be readily locked in the adjusted position by the screw 91. In actual operation the automatic charging stroke is very rapid and the cylinder and ram mechanism is such that a substantially full charge of lubricant is introduced to the cylinder 84 during each of these rapid charging strokes. The rapid full charging of the cylinder 84 assures the ejection of a complete charge of lubricant from the gun at each discharge stroke.

The device or gun may be operated until the follower 12 is stopped by the stop bead 9 on the guide 48. When the follower 12 reaches this position it becomes necessary to recharge the chamber 14 with lubricant. The section 11 may be readily unthreaded from the body 10 and removed from the body together with the guide 48 and the follower 12 to leave the chamber 14 open for recharging. The bead 9 cooperates with the forward portion 54 of the follower 12 so that the follower is moved or withdrawn rearwardly with the guide. The part 100 is uncovered when the bead 9 is in cooperation with the follower 12. This equalizes the pressures at the opposite sides of the follower so that the follower 12 may be easily pulled rearwardly out of the chamber 14.

When a replacement supply of lubricant has been provided in the chamber 14, the section 11 is moved to a position where the guide 48 extends into the chamber 14 and the follower 12 is advanced or moved to enter its small advancing lip 58 into the rear end of the chamber 14. As the lip 58 is smaller in diameter than the chamber 14 the follower 12 may be easily introduced into the chamber. When the trailing lip 59 contacts the wall of the chamber 14 the element 56 is distorted so that both of its sealing lips 59 effectively seal with the wall of the chamber. The section 11 may be easily threaded to the body 10. During the threading of the section 11 on the body 10 the gasket lip 40 moves into the chamber 14 and the flange 39 moves against the rear end of the body 10. Continued threading of the section 11 on the body 10 following the engagement of the gasket flange 39 with the end of the body results in distortion of the gasket 38 and the engagement of the lip 40 with the wall of the chamber 14. Thus the gasket 38 is automatically conditioned to dependably seal between the body 10 and the section 11. The section 11 may be rotated or threaded until the forward end of the flange 23 engages the ridge 26 to stop or limit the threading. The parts are related so that the handle 22 is stopped by this engagement to be in alignment with the laterally projecting discharge element 76.

Fig. 6 of the drawings illustrates a form of ejecting means 13$^a$ that may, at the option of the manufacturer or operator, be employed instead of the ejecting means 13 or used interchangeably with the ejecting means 13 described above. The means 13$^a$ is such that it may be employed in the body 10 and utilized in connection with the element 67 and its packing means 80—81—82 as described above.

In the form of the invention illustrated in Fig. 6 the element 67 constitutes the ram element and a cylinder element 101 is provided in the body 10 to move therewith and cooperate with the element 67. The cylinder element 101 has a forwardly facing external shoulder 102 and the spring 82 is held under compression between the shoulder 102 and the washer 82$^a$. The opening or cylinder 103 of the element 101 is co-axial with the forward portion 15 of the body 10 and is adapted to slidably receive the element 67. When the parts are in the normal or idle positions the rear end portion of the element 67 is received in the cylinder 103.

A combination valve cage and retainer nut 104 is threaded in the body opening 17 and cooperates with the flange 69$^a$ to hold the cylinder element 101 in place. The retainer nut 104 is provided with circumferentially spaced inwardly projecting webs 105 which carry a valve stem guide 106. The retainer nut 104 is a tubular member having an opening 120 which places the rear end of the cylinder 103 in communication with the chamber 14.

The valve means of the ejecting mechanism shown in Fig. 6 of the drawings includes a longitudinally shiftable valve stem 107. The stem 107 extends centrally and longitudinally through the elements 67 and 101. The rear portion of the stem 107 is threaded in a tubular valve stem member 108 and the member 108 is slidably guided in an opening 109 in the guide 106. A screw 110 is threaded in the rear end of the tubular member 108 and is cooperable with the rear end of the stem 107 to set or lock the stem in the adjusted position. The valve means further includes an inlet valve 111 movable with the stem member 108 and cooperable with a forwardly facing valve seat 112 on the interior of the retainer 104. The active faces of the valve 111 and the seat 112 may be normal to the longitudinal axis of the gun. The active face of the valve 111 may be provided with a washer or facing of suitable sealing material. In the preferred construction illustrated, the valve 111 is threaded on the stem member 108. A helical spring 113 is arranged under compression between a head on the stem member 108 and the rear end of the retainer nut 104 to urge the stem member 108 rearwardly and close the valve 111 during certain phases of the operation. The spring 113 is preferably light and may be conical or frusto-conical to extend over or around the fingers 105.

The ejecting means 13a shown in Fig. 6 has an outlet valve for controlling the discharge of lubricant from the element 67. This outlet valve includes a head 114 on the forward end of the stem 107. The head 114 has a tapered active face 115 cooperable with the above described seat 88. The valve face 115 has a steeper pitch than the seat 88 to have line contact therewith. When the parts are in the idle or normal positions the valve face 115 cooperates with the seat 88 to close the opening 85 and the inlet valve 111 is open or spaced forwardly from its seat 112. The spring 113, of course, tends to hold the valve head 114 in cooperation with its seat 88. However, the lubricant under pressure acting on the end 87 and the shoulder X of the element 67 urges the element 67 forwardly to effectively hold the seat 88 in tight engagement with the valve face 115. The fluid pressure or lubricant pressure acting on the member 67 thus serves to prevent the loss or leakage of lubricant from the opening 85.

The forward pressure exerted on the element 67 by the lubricant is transmitted to the valve stem 107 by the cooperating seat 88 and face 115 and this forward pressure on the stem 107 is in turn applied to the spring 113. The rearmost convolution of the spring 113 is between the head of the member 108 and the rear side of the guide 106 and when high pressure is applied to the lubricant in the chamber 14 the said convolution is gripped between the head of the guide member 108 and the rear side of the guide 106. Thus the rear convolution of the spring 113 may form a positive stop for limiting the forward movement of the stem 107 and the valve head 114 so that the forward travel of the element 67 is definitely limited by the engagement of its seat 88 with the valve face 115.

In the operation of the ejecting mechanism shown in Fig. 6 of the drawings the gun may be manipulated in the same manner as described above. Upon relative longitudinal movement between the body 10 and the element 67 that results in forward movement of the cylinder element 101 on the element 67, the stem may lag or may be momentarily held against such movement by the action or expansion of the spring 113 and the valve face 115 may remain in engagement with the seat 88. The face 115 may remain in engagement with the seat 88 to close the forward end of the opening 85 until the seat 112 moves forwardly against the active face of the valve 111. When the valve 111 is closed in this manner the stem 107 moves forwardly together with the body 10 and element 101 and therefore moves away from its seat 88. The lubricant in the cylinder 103 is displaced forwardly under pressure by the rearwardly moving element 67 and passes through the openings 84, 85 and 86 to the discharge element 76. It is to be observed that there is no spring in the path of this forwardly moving charge of lubricant under pressure to resist or interfere with its movement.

At the completion of the ejecting stroke the forward pressure is removed from the body 10 of the gun, or the fitting 76 is disconnected from the grease gun fitting, or both, and the lubricant under pressure acts on the valve 111 to open the same and the lubricant under pressure thus admitted to the cylinder 103 acts on the end 87 and the shoulder X of the element 67 to move the element forwardly. When the element 67 moves forwardly its seat 88 comes into contact with the valve face 115 so that the forward end of the opening 85 is closed. A charge of lubricant moves into the cylinder 103 as the element 67 moves forwardly. It will be seen that the lubricant pressure acting on the end 87 and the shoulder X of the element 67 automatically recharges the cylinder 103 and closes the outlet means to prevent the loss or leakage of lubricant from the gun.

Having described only typical preferred forms and applications of our invention we do not wish to be limited or restricted to the specific forms and applications herein set forth, but wish to reserve to ourselves any variations or modifications that may appear to those skilled in the art or fall within the scope of the following claims.

Having described our invention, we claim:

1. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage for discharging the lubricant thus displaced from the cylinder, an internal valve seat on the reciprocable element, a valve carried by the body and cooperable with the seat, and at least one surface on the reciprocable element acted on by the lubricant under pressure in the body whereby said pressure returns the seat to its closed position against the valve and normally holds the seat against the valve to close said passage against the discharge of lubricant.

2. A grease gun comprising a body for containing lubricant under pressure, and an ejecting means for ejecting charges of the lubricant including a ram stationary relative to the body, an element reciprocable relative to the body and having a cylinder for receiving the lubricant from the body during the charging stroke and adapted to receive the ram, there being a passage in the element for discharging the lubricant displaced from the cylinder by the ram, an internal valve seat in the element, a valve part normally stationary with respect to the body and cooperable with the seat, and at least one surface on the element acted on by the lubricant pressure in the body whereby said pressure urges the seat against the valve part to normally close said passage.

3. A grease gun comprising a body for containing lubricant under pressure, and an ejecting means for ejecting charges of the lubricant including a cylinder on the body having valved communication therewith, a ram reciprocable relative to the body and operable in the cylinder, the ram having a discharge passage for discharging the lubricant from the cylinder during the discharge stroke, an internal valve seat on the ram, a valve carried by the body and cooperable with the seat, and at least one surface on the ram acted on by the lubricant under pressure so that said pressure normally holds the seat and valve in cooperation to close said passage.

4. A grease gun comprising a body for containing lubricant under pressure, and an ejecting means for ejecting charges of the lubricant including a cylinder on the body having valved communication therewith, a ram reciprocable relative to the body and operable in the cylinder, the ram having a discharge passage for discharging the lubricant from the cylinder during the discharge stroke, an internal valve seat on the ram, a valve stem anchored to the body and extending through the cylinder and passage, a valve on the stem cooperable with the seat, and an inwardly facing surface on the ram acted on by the lubricant pressure whereby the said pressure operates to hold the seat and valve in cooperation.

5. An ejecting means for a grease gun having a body carrying lubricant under pressure, the ejecting means comprising a ram stationary with the body, a plunger element reciprocable relative to the body and having a cylinder for receiving a charge of lubricant from the body during the charging stroke and receiving the ram during the discharge stroke, the plunger element having a passage for discharging the lubricant from the cylinder during the discharge stroke, and discharge valve means controlling said passage including a valve part in the plunger element, and a valve part anchored to the body to be stationary therewith and cooperable with the first mentioned valve part.

6. A grease gun comprising a body having a chamber for holding lubricant under pressure and having an opening in communication with the chamber, and ejecting means for ejecting charges of the lubricant comprising a tubular part floating in said opening for limited movement, a ram carried by the tubular part in coaxial relation thereto, a reciprocable plunger element guided in the tubular part and having a cylinder for receiving the ram and a passage for discharging the lubricant from the cylinder, and valve means for controlling said passage.

7. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element having a ram operable in the cylinder to displace the lubricant therefrom, the reciprocable element having a passage for discharging the lubricant thus displaced, an internal valve seat on the reciprocable element, a spring urged check valve cooperable with the seat during the charging stroke of the reciprocable element to prevent a return flow in said passage, and a valve stationary with respect to the body and engageable by the check valve to form a seal, and at least one surface on the reciprocable element acted on by the pressure on the lubricant so that said pressure normally urges the said seat against the check valve and holds the check valve in sealing cooperation with the last mentioned valve.

8. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage for discharging the lubricant thus displaced, an internal valve seat on the reciprocable element, a ported tubular check valve in the reciprocable element cooperable with the seat during the charging stroke and opened during the discharge stroke, an internal seat on the check valve, a stem secured to the body and extending through the cylinder and slidably received in the check valve, and a valve on the stem cooperable with the said internal seat to seat therewith and to normally maintain cooperation between the check valve and the first mentioned seat.

9. A grease gun comprising a body for containing lubricant under pressure, and an ejecting means for ejecting charges of the lubricant including two elements, one stationary with respect to the body, the other reciprocable relative to the body, one element having a cylinder whose inner end is adapted to receive lubricant from the body, the other element being operable inwardly in the cylinder to displace the lubricant therefrom, the reciprocable element having a passage leading from the outer end of the cylinder for discharging the lubricant thus displaced, and a valve assembly at the outer end of the assembly for controlling flow through said passage in both directions.

10. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage for discharging the lubricant thus displaced, and a single valve assembly in the reciprocable element normally preventing the discharge of the lubricant under pressure through the passage and preventing the return flow of the discharged lubricant during the charging stroke.

11. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage for discharging the lubricant thus displaced, and a single valve assembly in the reciprocable element normally preventing the discharge of the lubricant under pressure from the cylinder through the passage and preventing the return flow of the discharged lubricant to the cylinder during the charging stroke said valve assembly comprising a valve part secured to the body, a valve part on the reciprocable element, and a valve element shiftable relative to the reciprocable element and cooperable with both of the said valve parts.

12. In a grease gun, a body having a lubricant supply chamber, ejecting means on the body, and means for feeding the lubricant to the ejecting means comprising a follower insertable in the chamber to follow the lubricant including a follower body, and a resilient sealing element on the follower body, the element having two axially projecting sealing lips, one leading relative to the direction of movement of the follower, the other trailing relative to said direction, the second mentioned lip initially having a diameter greater than that of the chamber whereby it cooperates with the wall of the chamber to distort the element and hold the first mentioned lip in sealing cooperation with the wall of the chamber.

13. In a grease gun, a body having a lubricant supply chamber, ejecting means on the body, and means for feeding the lubricant to the ejecting means comprising a guide insertable in the chamber, a follower arranged on the guide to move in the chamber behind the lubricant, the follower comprising an annulus, a sealing element on the periphery of the annulus for sealing with the wall of the chamber, and a resilient flexible sealing member on the interior of the annulus for sealing with the guide, said member having oppositely projecting axial sealing lips, one lip having an internal diameter less than the diameter of the guide to cooperate with the guide and cause distortion of the first named lip into sealing cooperation with the guide.

14. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage for discharging the lubricant thus displaced, an internal valve seat on the reciprocable element, a valve carried by the body and cooperable with the seat, said valve comprising a stem and a head thereon received in the said passage during the ejection stroke and retracted during the charging stroke to create a reduced pressure in the discharge passage and draw the lubricant back from its outer end, and at least one surface on the reciprocable element acted on by the lubricant under pressure in the body whereby said pressure normally holds the seat against the valve to close said passage against the discharge of lubricant.

15. A grease gun comprising a body for containing lubricant under pressure, and an ejecting means for ejecting charges of the lubricant including two elements, one stationary with respect to the body, the other reciprocable relative to the body, one element having a cylinder for receiving lubricant from the body, the other element being operable in the cylinder to displace the lubricant therefrom, the reciprocable element having a passage leading outwardly from the cylinder for discharging the lubricant displaced from the cylinder, an outwardly facing valve seat on the wall of the passage, a valve anchored to the body and facing inwardly toward the cylinder for engagement by the seat, and an inwardly facing surface on the reciprocable element acted on by the lubricant under pressure in the body to effect the quick return of the seat into engagement with the valve at the completion of the discharge stroke and to normally hold the seat against the valve to close the passage.

NEIL V. SMITH.
CARL W. STOLL.